G. E. HOGLUND.
APPARATUS FOR PREPARING MOVING PICTURE FILMS.
APPLICATION FILED JULY 16, 1909.
971,889.
Patented Oct. 4, 1910.
2 SHEETS—SHEET 2.
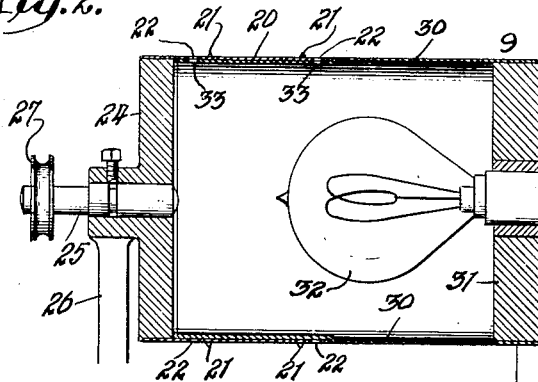
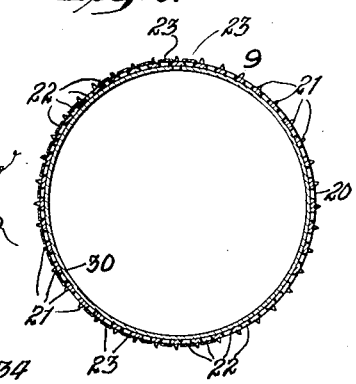
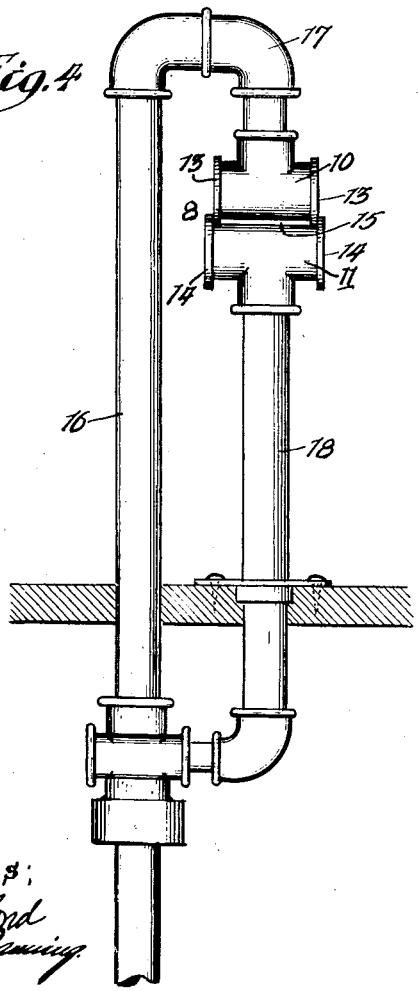
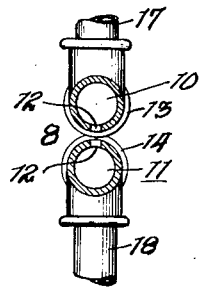
Witnesses:
Inventor:
Gustav E. Hoglund

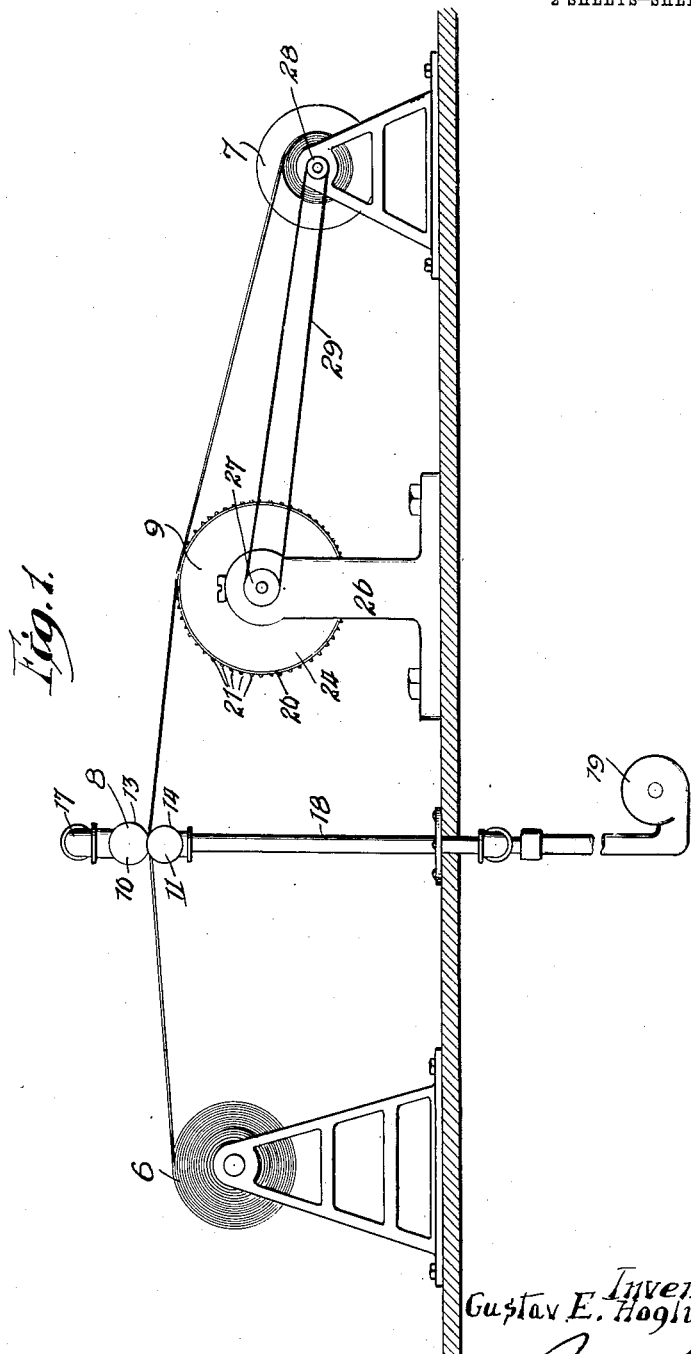

UNITED STATES PATENT OFFICE.

GUSTAV E. HOGLUND, OF CHICAGO, ILLINOIS, ASSIGNOR TO SELIG POLYSCOPE COMPANY, OF CHICAGO, ILLINOIS, A CORPORATION OF ILLINOIS.

APPARATUS FOR PREPARING MOVING-PICTURE FILMS.

971,889. Specification of Letters Patent. Patented Oct. 4, 1910.

Application filed July 16, 1909. Serial No. 507,941.

*To all whom it may concern:*

Be it known that I, GUSTAV E. HOGLUND, a citizen of the United States, residing at Chicago, in the county of Cook and State of Illinois, have invented certain new and useful Improvements in Apparatus for Preparing Moving-Picture Films, of which the following is a specification.

In the preparation of moving picture films, it is necessary to remove, from the emulsion side of the film, all particles of dust or the like prior to exposure of the film, in order that in taking the picture, such particles may not interfere with the exposure and cause marks or specks on the surface of the film. Such marks, if present, will destroy the beauty of the picture, when enlarged, by its projection on the screen, so that it is highly desirable that the surface of the film be entirely free from such particles when exposed. It is also desirable and necessary to imprint on the film, by photographic means, words or marks, in the nature of trade marks or descriptive marks, indicating the name of the maker of the film or other information of a like nature.

The object of the present invention is to provide means for removing the dust from the film, and immediately thereafter applying such identifying marks to the film, by photographic means, so that when the film leaves the apparatus it will be in perfect condition to use in the moving picture camera.

Further objects will appear from a detailed description of the invention, which consists in the features of construction and combination of parts hereinafter described and claimed.

In the drawings, Figure 1 is a diagrammatic view, showing the apparatus as a whole; Fig. 2 a sectional elevation of the sprocket drum and stencil drum; Fig. 3 a cross sectional view of the two drums; Fig. 4 a front elevation of the sucker heads, for removing dust particles; and Fig. 5 a cross sectional detail of the same.

The apparatus as a whole comprises a delivering reel 6, a receiving reel 7, suction devices 8, and printing devices 9. The suction devices are in the form of upper and lower sucker heads 10 and 11, respectively, each of which is provided, in its acting face, with a slot 12, the two slots being in register with one another to act upon the upper and lower faces of the film. The upper sucker head is preferably of somewhat smaller size than the lower sucker head, and is provided, at each end, with a flange 13, which flanges interlie a pair of flanges 14 at the ends of the lower sucker head, leaving a space 15 intermediate the two sucker heads for the passage of the film. The sucker heads are preferably of rounded or cylindrical formation, on their acting faces, and the slots 12 are located at the most closely convergent points on the respective sucker heads. The two sucker heads are connected with a suction header pipe 16, by means of upper and lower pipe connections 17 and 18, respectively, and the header pipe connects with a suitable exhausting apparatus 19, such as a fan, pump or the like.

The printing apparatus, which is located adjacent to and immediately beyond the sucker heads, comprises a sprocket drum 20, provided, around its periphery, with rows of sprocket teeth 21 adapted to engage with the usual holes along the edges of the film, and immediately outside of and adjacent to the sprocket teeth the drum is provided with a ring or rings of holes 22, each of which is adapted to have applied thereto a very small stencil plate 23 having a suitable letter, figure or other designating character cut therein. The sprocket drum, at one end, is provided with a drum head 24 which is secured to a shaft 25 journaled in an upright 26, which shaft is preferably provided with a pulley 27 which coöperates with a pulley 28 on the shaft of the receiving drum 7, so that the sprocket drum and the receiving drum may be rotated in unison and at the proper rate of speed by means of a belt 29, which affords sufficient slippage to compensate for the increasing diameter of the coil of film as it is rolled up on the receiving roll. Obviously, other means might be provided for operating these devices. The sprocket drum coöperates with a light cylinder 30, one end of which is closed by means of an end wall 31 which affords a mounting for an electric light 32. The other end of the light cylinder is open and is inserted in the open end of the sprocket drum which closely surrounds the light cylinder. The wall of the light cylinder, at a suitable point, is provided with a pair of exposure holes 33, one for each row of stencil holes with which the individual stencils are adapted to be successively brought into register. The light cylinder is supported in stationary position by means of an upright 34.

In preparing the film, the end will be passed between the upper and lower sucker heads, and will be passed over the surface of the sprocket drum and connected with the receiving drum. Thereafter the suction apparatus can be operated and the electric light turned on and the film fed forward at the speed desired. The action of the suction through the sucker heads will serve to remove dust or small particles of dirt from the film, and the film, in clean condition, will then be passed over the sprocket wheel, and the stencils carried thereby brought successively into register with the exposure holes so that the light from within the cylinder will successively shine through the stencils and photographically imprint the desired mark, letter or character on the sensitized surface of the film. By having the stencil holes in rows, it will be possible to photographically print complete words or phrases along the margins of the film, so that, when the film is developed, the words or phrases will appear and be permanently and indelibly applied to the film.

The device is one which enables the film to be marked for trade or identification purposes, in a manner which will prevent the unlawful use of the films; and the stencil holes, being between or in very close proximity to the sprocket teeth, it will be impossible to trim the edges of the films and remove the identifying marks, without also trimming off the sprocket holes in the film and destroying it for use.

I claim:

1. In apparatus of the class described, the combination of a rotatably mounted sprocket drum provided near its periphery with rows of teeth adapted to feed forward a section of photographic film contacting the upper edge of the drum, and further provided with a row of stencil holes in close proximity to one of the rows of teeth, a fixedly mounted light cylinder entered into the sprocket drum and provided with an exposure opening located at the point where the film contacts the top of the drum and with which the stencil holes are adapted to successively register, and an electric light within the light cylinder, substantially as described.

2. In apparatus of the class described, the combination of a sprocket drum provided, on its periphery, with a plurality of stencil holes, an illuminating device within the drum, a screen surrounding the light and provided, at a suitable point, with an exposure hole with which the stencil openings are adapted to register, a dust removing device located in proximity to the sprocket drum and comprising upper and lower slotted sucker heads, between which the film is adapted to travel, means for creating a suction through the slots, and pipe connections between the sucker heads and the suction producing means, substantially as described.

3. In apparatus of the class described, the combination of a drum adapted to feed forward a photographic film and provided, on its periphery, with a plurality of stencil holes, an illuminating device within the drum, a screen surrounding the light and provided, at a suitable point, with an exposure hole with which the stencil openings are adapted to register, a dust removing device located in proximity to the sprocket drum and comprising upper and lower slotted sucker heads, between which the film is adapted to travel, means for creating a suction through the slots, and pipe connections between the sucker heads and the suction producing means, substantially as described.

4. In apparatus of the class described, the combination of a sprocket drum provided with a plurality of stencil holes, an illuminating device within the drum, a screen surrounding the light and provided, at a suitable point, with an exposure hole with which the stencil openings are adapted to register, a dust removing device located in proximity to the sprocket drum and comprising upper and lowed slotted sucker heads, between which the film is adapted to travel, means for creating a suction through the slots, and pipe connections between the sucker heads and the suction producing means, substantially as described.

5. In apparatus of the class described, the combination of a drum adapted to feed forward a photographic film and provided with a plurality of stencil holes, an illuminating device within the drum, a screen surrounding the light and provided, at a suitable point, with an exposure hole with which the stencil openings are adapted to register, a dust removing device located in proximity to the sprocket drum and comprising upper and lower slotted sucker heads, between which the film is adapted to travel, means for creating a suction through the slots, and pipe connections between the sucker heads and the suction producing means, substantially as described.

6. In apparatus of the class described, the combination of a rotatably mounted sprocket drum adapted to feed forward a section of photographic film and provided, on its periphery, with rows of teeth, and further provided with a row of stencil holes in close proximity to one of the rows of teeth, a fixedly mounted light cylinder entered into the sprocket drum and provided with an exposure opening with which the stencil holes are adapted to successively register, an electric light within the light cylinder, a dust removing device located in proximity to the sprocket drum and comprising upper and lower slotted sucker heads, between which the film is adapted to travel, means for creating a suction through the slots, and pipe connections between the sucker heads and the suction producing means, substantially as described.

GUSTAV E. HOGLUND.

Witnesses:
FRANCES M. FROST,
WALKER BANNING.